United States Patent [19]
Dardas

[11] 3,766,015
[45] Oct. 16, 1973

[54] PRESERVATION OF BOVINE STOMACHS FOR RENNET EXTRACTION

[75] Inventor: Richard B. Dardas, Gales Ferry, Conn.

[73] Assignee: Pfizer Inc., New York, N.Y.

[22] Filed: Mar. 2, 1972

[21] Appl. No.: 231,357

[52] U.S. Cl.................. 195/66, 195/65, 426/332
[51] Int. Cl........................ A22c 18/00, A23b 1/00
[58] Field of Search.................. 99/107, 157, 194, 99/222; 195/68, 65, 66

[56] References Cited
UNITED STATES PATENTS

| | | | |
|---|---|---|---|
| 2,337,947 | 12/1943 | Thornley et al. | 195/66 |
| 2,339,931 | 1/1944 | Keil | 195/68 |
| 2,784,102 | 3/1957 | Herman et al. | 99/157 |
| 2,806,793 | 9/1957 | Kemps | 99/107 X |

*Primary Examiner*—Hyman Lord
*Attorney*—Arthur G. Connolly et al.

[57] ABSTRACT

High recovery yields of rennet are obtained from calf and adult bovine stomachs packed in a solid salt selected from the group consisting of sodium sulfate, potassium sulfate, ammonium chloride and ammonium sulfate, and stored under refrigeration.

1 Claim, No Drawings

PRESERVATION OF BOVINE STOMACHS FOR RENNET EXTRACTION

BACKGROUND OF THE INVENTION

In the cheese industry, the term rennet generally refers to a brined extract of calf stomachs used to coagulate milk for cheese production. In general usage, any milk-clotting enzyme preparation yielding a relatively stable curd is designated a rennet (or rennin, if pure).

The preponderant proportion of cheese produced on a commercial scale is made from cows' milk. In practice, rennet is added to prepared milk to cause coagulation of casein and consequent curd formation. The curd is then treated further to yield a cheese whose type is determined by the nature of the processing employed. The production of rennet and its use in milk-clotting are described in Methods in Enzymology; Kolwick and Kaplan, Academic Press; Advances in Enzymology, 15, 423–448 (1954); Compt. Rend. Trav. Lab. Carlsberg, 35, No. 8, 143–166 (1966); U.S. Pat. Nos. 2,339,931; 2,337,947 and French Pat. No. 994,082.

Calf rennet remains the industry standard against which other coagulants are measured. However, decling calf slaughter has resulted in a world-wide shortage of stomach raw materials for rennet production. This is reflected in the growing use of adult bovine stomachs with their lower rennet content, and processes for increasing the recoverable yield of rennet from these tissues.

Packing in rock salt or sodium chloride crystals is a traditional method for meat preservation and prevention of microbial growth. In the present practice of rennet production, it is customary to wash the calf and adult bovine stomachs with water immediately after slaughter and pack them in solid sodium chloride prior to storage under refrigeration. The rennet is subsequently extracted from the tissues with water or 5 to 10 percent w/v sodium chloride solutions.

This invention is concerned with the use of simple, inorganic salts for the preservation and storage of calf and adult bovine stomachs which allow higher yields of rennet than that obtained with presently used solid sodium chloride.

SUMMARY OF THE INVENTION

This invention is concerned with methods for the preservation of calf and and adult bovine stomachs under storage for subsequent extraction of rennet. It has been found that packing these stomachs in a solid salt such as sodium sulfate, potassium sulfate, ammonium chloride or ammonium sulfate prior to storage allows for increased yields of extracted rennet of 50 percent or more than presently used solid sodium chloride.

DETAILED DESCRIPTION OF THE INVENTION

It has been found that covering the complete surfaces of calf or adult bovine stomachs with solid sodium sulfate, potassium sulfate, ammonium chloride or ammonium sulfate prior to storage under refrigeration allows subsequent extraction yields of rennet at least 50 percent higher than presently used solid sodium chloride and approximately equal to that obtained from fresh calf and adult bovine stomachs. No explanation can be offered at this time for this unexpected finding.

Potassium sulfate, sodium sulfate, ammonium chloride and ammonium sulfate are cheap and effective substitutes for sodium chloride for the preservation of calf and adult bovine stomachs for rennet extraction. These compounds do not inactivate or bind rennet, are considered non-toxic for food purposes, and because of their high solubility in water, they have sufficient osmotic pressure to exert a bacteriostatic effect. Ammonium chloride and ammonium sulfate are especially useful because of their extremely high solubility in water and resultant high osmotic pressure. Furthermore, these salts do not readily crystallize out of enriched or concentrated aqueous rennet extracts.

The salts are evaluated and compared with sodium chloride by placing so treated bovine stomachs under refrigeration. The refrigeration temperature is not critical and it may range from as low as 3°C. to as high as 10°C., and generally, in accordance with custom, a temperature of from 4° to 5°C. is employed.

After intervals of storage under refrigeration, the individual stomachs are placed in water or 5 to 10 percent w/v sodium chloride solution at a 3:1 ratio of liquid to tissue at a temperature of about 37°C. for approximately 48 hours. This process is repeated for a total of 3 such extractions. The extracts from each stomach are combined, and assayed for rennet by a modification of of the milk-clotting assay of C.A. Ernstrom, J. Dairy Science, 41, No. 12, 1664 (1958). The assay is based on the length of time required for the rennet in solution to clot a known amount of milk, under the test conditions, as compared with a working reference which is expressed in arbitrary rennet units.

The following examples are given by way of illustration and are not to be construed as limitations of this invention, variations of which are possible without departing from the spirit or scope thereof.

EXAMPLE I

Adult bovine stomachs are washed with water immediately after slaughter. The entire surfaces of individual stomachs are covered with each of the following solid salts: sodium chloride, sodium sulfate and ammonium sulfate. After time periods of 1 week, 2 weeks and 4 weeks of storage under refrigeration (4°–5°C.), individual stomachs are placed in water at a 3:1 ratio of water to meat, and held at 37°C. for about 48 hours each for a total of 3 such extractions. The extracts from each stomach are combined and assayed for rennet, as shown in the following table. The body of the table is expressed in arbitrary rennet units per gram of tissue.

| Salt | Storage Time (weeks) | | |
|---|---|---|---|
| | 1 | 2 | 4 |
| Sodium chloride | 16.8 | 9.8 | 26.9 |
| Sodium sulfate | 27.5 | 12.5 | 78.0 |
| Ammonium sulfate | 35.5 | 42.9 | 72.4 |

EXAMPLE II

The method of Example I is repeated with potassium sulfate in place of sodium sulfate, and ammonium chloride in place of ammonium sulfate, with comparable results.

EXAMPLE III

Calf stomachs are washed with water immediately after slaughter. Individual stomachs are completely covered with solid ammonium sulfate, and a control group of stomachs is covered with solid sodium chloride. After time periods of 1 week, 2 weeks and 5 weeks storage under refrigeration (4°–5°C.), individual calf stomachs are placed in 10 percent w/v sodium chloride solution at a 3:1 solution to meat ratio, and held at 37°C. for about 48 hours each for a total of 3 such extractions. The extracts from each stomach are combined and assayed for rennet, as shown in the following table.

| Salt | Storage Time (weeks) | | |
|---|---|---|---|
| | 1 | 2 | 5 |
| Sodium chloride | 89 | 59 | 75 |
| Ammonium sulfate | 117 | 104 | 108 |

Example IV

Example III is repeated in turn with sodium sulfate, potassium sulfate and ammonium chloride in place of ammonium sulfate, with comparable results.

What is claimed is:

1. In the method for preserving calf and adult bovine stomachs for subsequent rennet extraction by treatment of said stomachs with a preserving agent, then storing the treated stomachs under refrigeration and subsequently obtaining rennet from said treated stomachs, the improvement which comprises covering the complete surfaces of said stomachs with a solid salt selected from the group consisting of sodium sulfate, potassium sulfate, ammonium chloride and ammonium sulfate prior to storage under refrigeration.

* * * * *